United States Patent

Hassani

(10) Patent No.: US 11,866,007 B2
(45) Date of Patent: Jan. 9, 2024

(54) BLOCKCHAIN AUTHENTICATION OF A VEHICLE RIDER

(71) Applicant: Ford Global Technologies, LLC, Dearborn, MI (US)

(72) Inventor: Ali Hassani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 742 days.

(21) Appl. No.: 16/976,106

(22) PCT Filed: Mar. 7, 2018

(86) PCT No.: PCT/US2018/021382
§ 371 (c)(1),
(2) Date: Aug. 27, 2020

(87) PCT Pub. No.: WO2019/172905
PCT Pub. Date: Sep. 12, 2019

(65) Prior Publication Data
US 2020/0406859 A1    Dec. 31, 2020

(51) Int. Cl.
*B60R 25/00* (2013.01)
*G06F 21/32* (2013.01)
(Continued)

(52) U.S. Cl.
CPC .......... *B60R 25/25* (2013.01); *B60R 25/2018* (2013.01); *B60R 25/241* (2013.01); *B60R 25/252* (2013.01); *B60R 25/255* (2013.01); *B60R 25/305* (2013.01); *G06F 16/2465* (2019.01); *G06F 16/27* (2019.01);
(Continued)

(58) Field of Classification Search
CPC ... B60R 25/25; B60R 25/2018; B60R 25/241; B60R 25/252; B60R 25/255; B60R 25/305; B60R 2325/108; G06F 16/2465; G06F 16/27; G06F 21/32; G06F 2216/03; G06N 3/02; H04L 9/3213; G06Q 10/02; G06Q 30/0185; G06Q 30/0609; G06Q 50/265; G06Q 50/30; G06Q 2240/00
See application file for complete search history.

(56) References Cited

U.S. PATENT DOCUMENTS

2010/0066513 A1    3/2010  Bauchot et al.
2015/0317855 A1*  11/2015  Sezan ................ G06F 21/35
                                                                340/5.52
(Continued)

OTHER PUBLICATIONS

International Search Report of the International Searching Authority for PCT/US2018/021382 with dated May 21, 2018.

*Primary Examiner* — Amie C. Lin
(74) *Attorney, Agent, or Firm* — Brandon Hicks; Eversheds Sutherland (US) LLP

(57) ABSTRACT

Systems, methods, and devices for verifying an identity of a user of a vehicle. The method includes receiving user authentication data from a vehicle sensor and generating a transaction token comprising the user authentication data. The method includes transmitting the transaction token to a blockchain database. The method includes receiving a message from the blockchain database comprising one or more of: a request for additional user authentication data; or an indication that a rider authentication server has verified the identity of the user.

20 Claims, 8 Drawing Sheets

(51) Int. Cl.
  *B60R 25/25* (2013.01)
  *G06F 16/27* (2019.01)
  *G06F 16/2458* (2019.01)
  *B60R 25/20* (2013.01)
  *B60R 25/24* (2013.01)
  *B60R 25/30* (2013.01)
  *G06N 3/02* (2006.01)
  *H04L 9/32* (2006.01)

(52) U.S. Cl.
  CPC ............... *G06F 21/32* (2013.01); *G06N 3/02* (2013.01); *H04L 9/3213* (2013.01); *B60R 2325/108* (2013.01); *G06F 2216/03* (2013.01)

(56) References Cited

U.S. PATENT DOCUMENTS

| | | |
|---|---|---|
| 2016/0328713 A1 | 11/2016 | Ebrahimi |
| 2017/0046526 A1 | 2/2017 | Chan et al. |
| 2017/0132625 A1 | 5/2017 | Kennedy |
| 2018/0012433 A1* | 1/2018 | Ricci ................. B60L 53/65 |
| 2018/0109541 A1* | 4/2018 | Gleichauf ............... H04W 8/24 |
| 2018/0202822 A1* | 7/2018 | DeLizio ................. B60R 25/24 |
| 2019/0096021 A1* | 3/2019 | Jarvis ................. G06Q 20/4012 |
| 2019/0132131 A1* | 5/2019 | Clements ............. H04L 9/3239 |

* cited by examiner

BLOCKCHAIN AUTHENTICATION OF A VEHICLE RIDER

TECHNICAL FIELD

The disclosure relates generally to systems and methods for verifying an identify of a vehicle user. The disclosure particularly relates to verifying an identify of a vehicle user with blockchain technology and a neural network.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. As another example, autonomous vehicles may serve as ridesharing vehicles or paid transportation vehicles that may permit certain persons to enter the vehicle after verifying the person's identity.

Ridesharing and taxiing services permit passengers to share a vehicle to reduce vehicle trips, traffic congestion, and vehicle emissions. Types of transportation that may be considered ridesharing or taxiing include carpooling, vanpooling, public transportation (including bus, train, or other vehicle types), reserved taxi services, and the like. Passengers in a rideshare or taxi environment might have reserved a specific vehicle, might have an assigned seat on a vehicle, or might have reserved certain upgrades or accommodations for the trip. In various embodiments of reserving a vehicle, such as a rideshare or taxi, it may be beneficial to verify the identity of a rider before permitting the rider to enter the vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
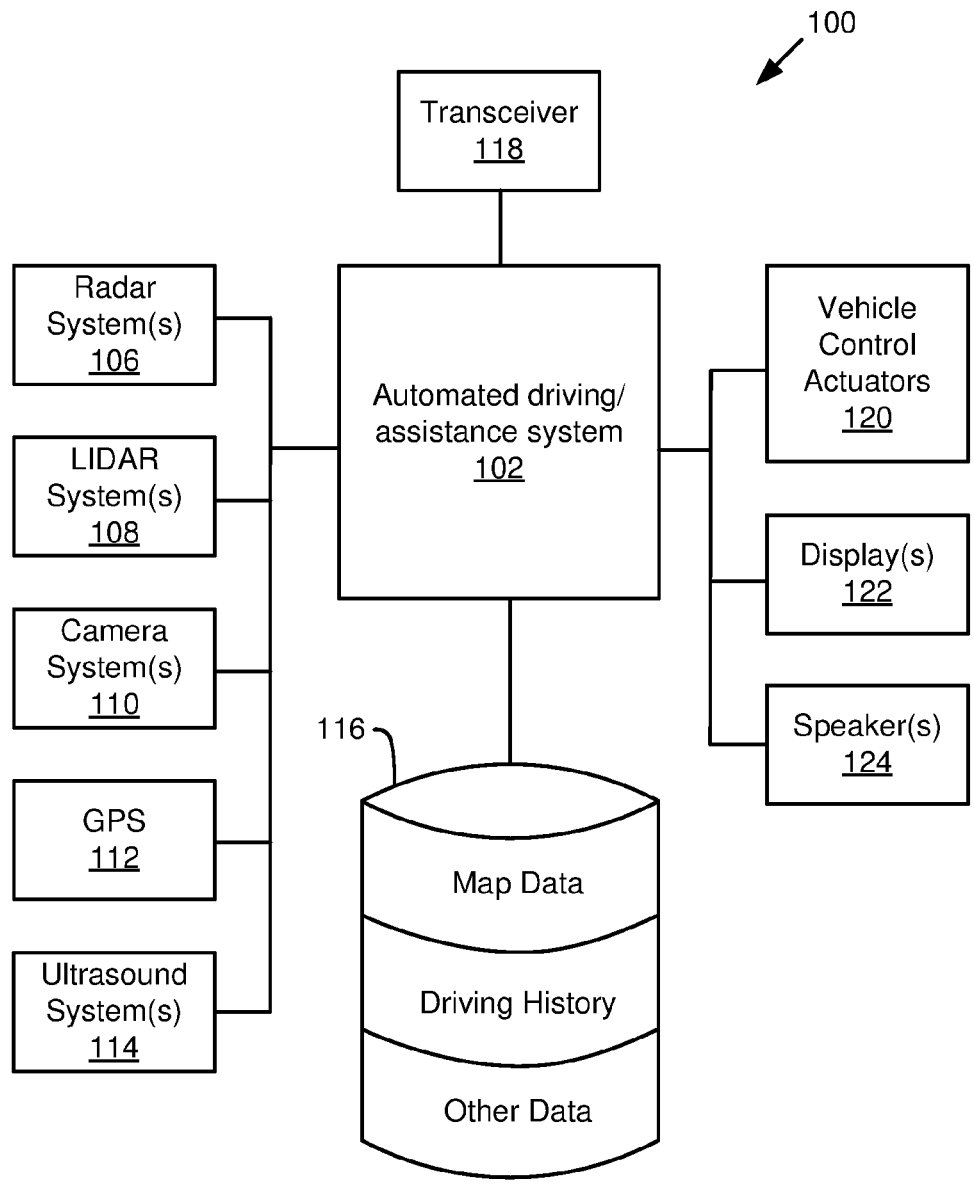
FIG. 1 is a schematic block diagram illustrating an implementation of a vehicle control system that includes an automated driving/assistance system, according to one implementation.

The disclosure extends to methods, systems, and devices for determining and verifying an identify of a vehicle user or rider. The disclosure extends to enrolling a vehicle user in a reservation system and verifying the user's identity using biometric data.

Before the methods, systems, and devices for determining and verifying an identify of a vehicle rider are described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a, "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A challenge for autonomous vehicles is rider authentication or verifying the identity of a user seeking to board a vehicle, such as a rideshare vehicle, a shuttle, a bus, a taxi, and so forth. A further challenge is correctly billing persons for rides performed by autonomous vehicles. Biometric data, including facial recognition data and so forth, may serve to accurately verify a user's identity. However, it should be recognized that biometric data must be stored and transmitted securely. Data stored on a cloud-based server may be made mostly secure against hacks, but this does not guarantee transmissions between vehicles and the cloud cannot be intercepted.

Applicant has developed systems, methods, and devices for verifying an identity of a user of a vehicle. The systems, methods, and devices of the present disclosure are directed to a blockchain database for autonomous vehicle rider authentication. In embodiments of the disclosure, riders perform an authentication challenge by permitting a vehicle sensor, such as a biometric read, to scan the rider's biometric. The user authentication data (i.e. biometric data) may be any combination of, for example, placing fingerprint scanners in the door applique, using exterior cameras or LIDAR sensors to perform facial recognition, using a UV-A keypad to perform iris recognition, and so forth. The vehicle may perform feature extraction on the user authentication data locally to minimize the data size and extract only the most usable data from the raw data received from the vehicle sensor. The vehicle may transmit an authentication request via a blockchain database to a cloud-based authentication cloud. The authentication may review the extracted features and determine if the identity of the user can be verified. Should the authentication cloud recognize the user, the cloud will fetch the user's personal information and transmit it to the vehicle via the blockchain database.

An embodiment of the disclosure includes a private blockchain for use with autonomous vehicles for rider authentication. The system includes a rider authentication server that dictates and manages the private blockchain. The rider authentication server defines node permissions and mines the blockchain to verify the authenticity of blocks stored on the blockchain database. The rider authentication server comprises a recognition neural network to authentication users via biometric data. The recognition neural network may compare user authentication data received from biometric readers in real-time with stored user template data that is stored on the private blockchain to verify or determine an identity of a user. Autonomous vehicles serve as lesser nodes to the blockchain database, send authentication requests, and contribute to mining the blockchain database. The system is such that user data is decentralized over an entire fleet of autonomous vehicles such that there is no single server for a thief to hack, and every transaction is exceptionally secure.

In an embodiment, a method for verifying an identity of a user of a vehicle is disclosed. The method includes receiving user authentication data from a vehicle sensor. The method includes generating a transaction token comprising the user authentication data and transmitting the transaction token to a blockchain database. The message includes receiving a message from the blockchain database comprising one or more of: a request for additional user authentication data; or an indication that the identity of the user has been verified.

In an embodiment, a system for verifying an identity of a user of a vehicle is disclosed. The system includes a vehicle controller. The system includes one or more vehicle sensors in electronic communication with the vehicle controller and configured to determine user authentication data of a user of a vehicle. The system includes a rider authentication server configured to verify an identity of the user of the vehicle and a blockchain database. The system is such that the rider authentication server comprises a central node of a blockchain database.

An embodiment of the disclosure includes a plurality of autonomous vehicles in communication with an authentication cloud. The authentication cloud serves as the central node of a blockchain database and each of the autonomous vehicles serves as a periphery node of the blockchain database. In such an embodiment, biometric template data and user's personal information is never stored on the authentication cloud and is stored only on the decentralized blockchain database. The blockchain database is inherently decentralized and maintained by all nodes on the chain i.e. the authentication cloud (or rider authentication server) and the plurality of autonomous vehicles. The authentication cloud dictates the blockchain security requirements, such as encryption requirements, the blockchain rules, such as where personal and biometric data are distributed across various blocks, and the blockchain permissions, such as which vehicles are permitted to access the blockchain. As such, the only way for a hacker to gain meaningful data would be to know the exact location of a required block as well as the precise encryption protocol.

Referring now to the figures, FIG. 1 illustrates an example vehicle control system 100 that may be used for autonomous or assisted driving. The automated driving/assistance system 102 may be used to automate or control operation of a vehicle or to aid a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. A heads-up display may be used to provide notifications or indicate locations of detected objects or overlay instructions or driving maneuvers for assisting a driver. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

Figure 2:
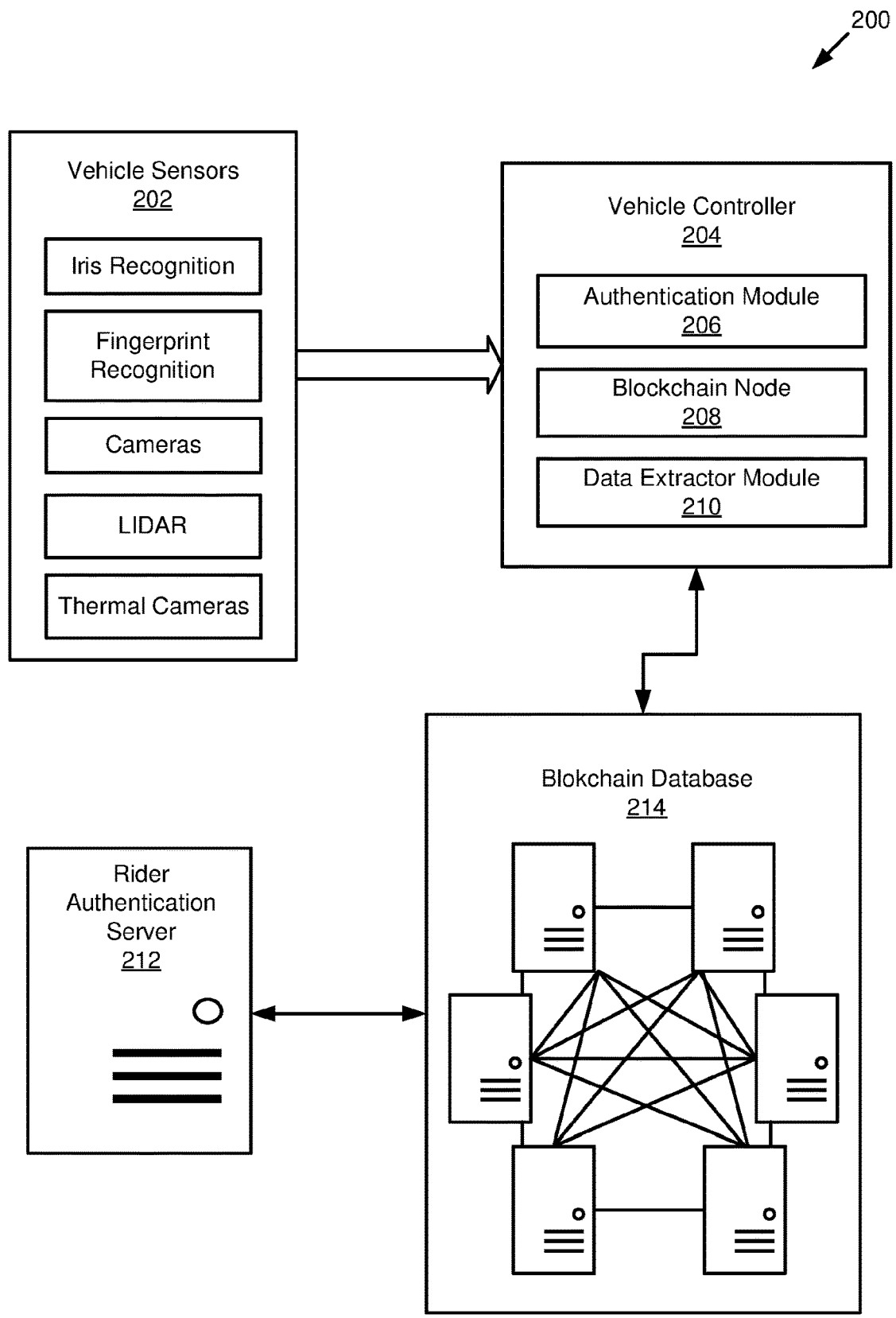
FIG. 2 is a schematic block diagram illustrating a system for verifying an identity of a vehicle user, according to one implementation.

FIG. 2 is a schematic block diagram illustrating a system 200 for verifying an identity of a vehicle user. The system 200 includes vehicle sensors 202 in communication with a vehicle controller 204. The vehicle sensors 202 include, for example, iris recognition sensors, fingerprint recognition sensors, cameras, LIDAR sensors, and thermal cameras. In an embodiment the vehicle sensors include biometric readers. It should be appreciated that any suitable biometric readers or other sensors may be used that may assist in verifying an identity of a vehicle user or rider. The vehicle sensors 202 may be attached to a vehicle and may be in electronic communication with the vehicle controller 204, such as the automated driving/assistance system 102 of FIG. 1.

The vehicle controller 204 may be located within the vehicle and may include an onboard computing system. The vehicle controller 204 includes an authentication module 206 and a data extractor module 210. In an embodiment, the vehicle controller 204 is a blockchain node 208 of a blockchain database 214. The vehicle controller 204 may further comprise a blockchain co-processor for assisting in maintaining the blockchain database 214, mining the blockchain database 214, and assisting in encryption and decryption of data received from or transmitted to the blockchain database 214.

The authentication module 206 is configured to assist in verifying an identity of a vehicle user or rider. The authentication module 206 includes a wake-up that is triggered to initiate the authentication module 206 and begin the process of verifying the identity of the user. In an embodiment, the wake-up is triggered by a user grasping a door handle, the user's personal mobile phone pairing with the vehicle, or an environmental sensor of the vehicle that determines a user is within a small distance of the vehicle. The authentication module 206 may further be configured to receiver user authentication data from a vehicle sensor 202, generate a transaction token for the blockchain database 214, and receiving a message from the blockchain database 214.

The data extractor module 210 is configured to extract a feature from user authentication data received from a vehicle sensor 202. The vehicle controller 204 receives raw user authentication data from the vehicle sensor 202. The data extractor module 210 extracts a feature from the raw user authentication data provide more useful information and to reduce the file size and enable faster file transfers. The extracted feature includes, for example, a perimeter or shape of the user's face, facial proportions such as relative distance between eyes or length of the nose, blood vessel patterns detected by infrared sensors, and changes in three-dimensional depth of the face that may be detected by bi-focal lenses or ultrasonic sensors. The extracted features may be packaged with the user's authentication ID as a transaction token for the blockchain database 214. It should be appreciated that the data extractor module 210 may alternatively be integrated into a vehicle sensor 202 such that the vehicle sensor 202 provides extracted features, rather than raw data, to the vehicle controller 204.

The rider authentication server 212 serves as a central authentication server that dictates and manages a private blockchain database 214. The rider authentication server 212 defines permissions for the blockchain database 214 and assists in mining the blockchain database 214. In an embodiment, the rider authentication server 212 includes a neural network for verifying an identity of a vehicle user by way of user authentication data received from the vehicle sensors 202. In an embodiment, the rider authentication server 212 is the central node of the blockchain database 214.

In an embodiment, the rider authentication server 212 is responsible for enrollment of a user account. Enrollment is initiated when a user (such as a vehicle rider or driver) creates an account on a ride hailing system, such as a mobile or web-based application or system for scheduling a ride or vehicle reservation. The user connects to the rider authentication server 212 to generate a personal profile. The personal profile may include any suitable information including for example, the user's name, date of birth, address, phone number, payment information, demographic information, and so forth. The rider authentication server 212 further generates an authentication ID when the user creates a personal profile. The authentication ID is a unique identifier associated with the user. In an embodiment, when the user hails a ride, such as schedules a vehicle reservation or rideshare, the authentication cloud (see 302 in FIG. 3) receives the authentication ID and is informed that the user is requesting to be enrolled in the ride hailing system. In an embodiment, the user's enrollment in the ride hailing system is completed when a reserved vehicle arrives. In an embodiment, the user's personal mobile phone will pair with the vehicle controller 204 and the user will be offered several options for verifying his identity. The user may select to choose biometric verification through vehicle sensors 202 including biometric readers. In such an embodiment, the user may receive instruction for how to align with the vehicle sensors 202 to provide user authentication data for verifying the user's identity. The system 200 receives the user authentication data from the vehicle sensors 202 and processes the data to grant or deny the user's access to the vehicle. In an embodiment, the vehicle controller 204 grants access to the user and transmits the user's account enrollment information, including for example, the authentication ID, the biometric data, and the personal profile, to the blockchain database 214. The rider authentication server 212 is accordingly updated to associate the authentication ID with a particular location within the blockchain database 214 for faster queries in the future.

In an embodiment, enrollment includes providing biometric data to be stored as user biometric template data on the blockchain database 214. The rider authentication server 212 may compare (via the recognition neural network 308) the user biometric template data against user authentication data received from a vehicle sensor. The recognition neural network 308 may thereby verify the identity of the user. In an embodiment a user may wish to update his password, update his biometric data, or provide a backup password or biometric data. While fingerprints are relatively stable, other biometrics (such as facial recognition data) is known to change over time. As such, the user may be instructed to create a backup biometric data password. Further, a user may request a vehicle to update their user biometric template data stored on the blockchain database 214. In an embodiment, a confirmation from the user of backup biometric data would be required prior to adding a block to the blockchain database 214 to change the user's biometric template data.

In an embodiment where a user owns a vehicle that is permitted to access the blockchain database 214, the user may enroll in the system through that vehicle biometric readers. In an embodiment, the vehicle provides instructions for enrolling in the authentication system and the vehicle would then integrate the user's account into the blockchain database 214. It should be appreciated that for security purposes, only trusted vehicles may be permitted to join the blockchain database 214. However, the authentication cloud 302 may add rules to permit a user's personal mobile phone to temporarily perform as a node of the blockchain database 214 solely to enroll a user in the authentication system. This enables a user to complete enrollment on his phone by providing biometric data and securely transmitting the data to the blockchain database 214.

Figure 3:
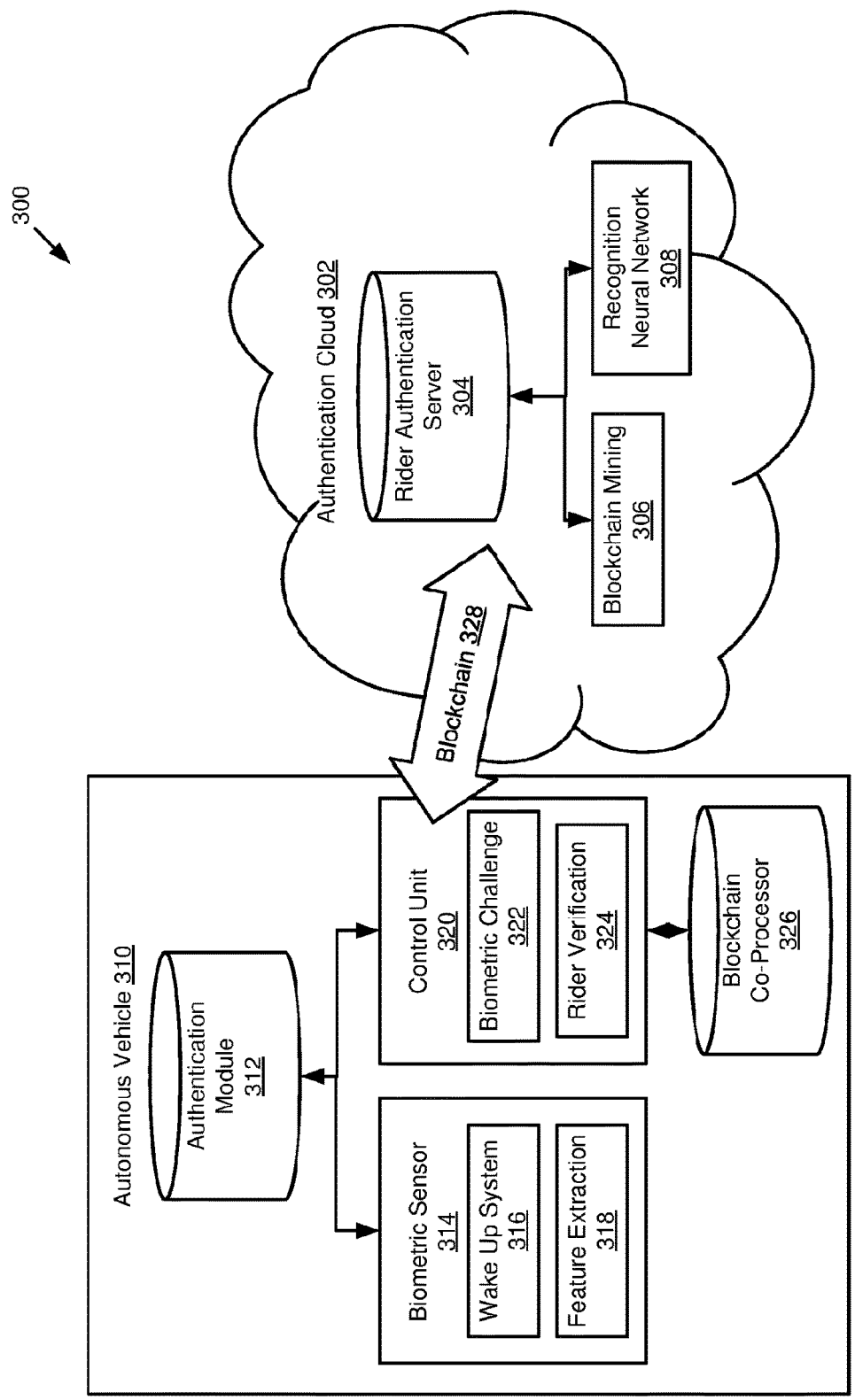
FIG. 3 is a schematic block diagram illustrating a system for verifying an identity of a vehicle user, according to one implementation.

FIG. 3 is a schematic block diagram illustrating a system 300 for verifying an identity of a user of a vehicle. The system 300 includes an autonomous vehicle 310 in communication with an authentication cloud 302 via a blockchain database 328. The autonomous vehicle 310 includes an authentication module 312, a biometric sensor 314, and a control unit 320. The biometric sensor 314 includes a wake up system 316 and a feature extraction system 318. The control unit 320 includes a biometric challenge 322 and a rider verification 324. The autonomous vehicle 310 further includes a blockchain co-processor 326. The authentication cloud 302 includes a rider authentication server 304 in communication with a blockchain mining 306 unit and a recognition neural network 308.

The autonomous vehicle 310 includes any autonomous vehicle 310 or driver assistance vehicle known in the art, including the vehicle disclosed in FIG. 1. The biometric sensor 314 includes any suitable biometric reader known in the art, including those vehicle sensors 202 disclosed in FIG. 2. The wake-up system 316 is configured to wake up the authentication module 312 based on a trigger. The authentication module 312 may be triggered by the wake-up system 316 when, for example, a sensor detects the presence of a user near the vehicle, the user grabs a handlebar of the vehicle, or the user's personal mobile phone pairs with the vehicle. The feature extraction 318 of the biometric sensor 314 may function like the data extractor module 210 disclosed in FIG. 2. In an embodiment, the biometric sensor 314 includes a feature extraction 318 and the vehicle controller 204 further includes a data extractor module 210. In such an embodiment, each of the feature extraction 318 and the data extractor module 210 is configured to perform a feature extraction on the raw user authentication data received from a vehicle sensor 202 such as a biometric sensor 314.

The control unit 320 generates a transaction token including the biometric challenge 322 and transmits the transaction token to the authentication cloud 302 via the blockchain database 328. The biometric challenge 322 includes the extracted feature that was extracted from the raw user authentication data received from a biometric sensor 314. The transaction token includes biometric challenge 322 (i.e. the extracted data) and the user's authentication ID. The biometric challenge 322 transaction token is transmitted to the authentication cloud 302 via the blockchain database 328. The rider verification 324 receives a message from the blockchain database 328 indicating that the authentication cloud 302 has verified the user's identity based on the biometric challenge 322, has not been able to verify the user's identity, or requires additional user authentication data. Where the user's identity is verified by the authentication cloud 302, the rider verification 324 transmits a message to the autonomous vehicle 310 indicating that the user should be granted access to the autonomous vehicle 310.

The blockchain co-processor 326 may serve as a node on the blockchain database 328. The blockchain co-processor 326 is configured to assist in mining the blockchain database 328 to ensure that each of the blocks stored on the chain are verified. The blockchain co-processor 326 is further configured to handle encryption and decryption of data transmitted to and received from the blockchain database 328.

The authentication cloud 302 manages a private blockchain database 328 that decentralizes user authentication data. The blockchain database 328 is a decentralized database where every transaction is verified by a strict set of chain rules and encryption is layered each time a new block is added to the blockchain database 328. The authentication cloud 302 plays the role of a central node of the blockchain database 328. The authentication cloud 302 defines database permissions including which autonomous vehicle 310 are permitted to request access to the blockchain database 328, handles decryption of biometric challenges 322, handles encryption of user personal profile information, and mines the blockchain database 328 to verify that all blocks of the chain are valid. The authentication cloud 302 includes the rider authentication server 304 and it should be appreciated that the rider authentication server 304 may perform each of the aforementioned tasks.

The rider authentication server 302 performs blockchain mining 306 of the blockchain database 328. Blockchain mining 306 includes mining the blockchain database 328 to verify that all blocks of the chain are valid. The rider authentication server 304 includes or is in communication with a recognition neural network 308. The recognition neural network 308 is configured to verify the identity of the user with the user authentication data received from the biometric sensor 314. The recognition neural network 302 performs the classification upon receiving the transaction token from the autonomous vehicle 310. The rider authentication server 302 fetches the blocks whose locations are associated with the user's authentication ID, transmits those blocks to the recognition neural network 302, and the recognition neural network 302 verifies the biometric challenge 322 matches the stored biometric template data. If the biometric template data and the biometric challenge 322 are a match, then the recognition neural network 302 indicates that the identity of the user has been verified.

The blockchain database 328 comprises a decentralized network of computing nodes which form blocks. The transactions 328 are authenticated and grouped as blocks, so altering information is impossible. In an embodiment, the authentication cloud 302 or rider authentication server 304, and the blockchain co-processor 326, validate and authenticate a transaction stored on the blockchain database 328 through consensus. In such an embodiment, transactions cannot be altered after a transaction has been stored to the blockchain database 328.

In an embodiment, authentication is initiated by a user waking up a biometric reader and following the recognition process. The authentication cloud 302 receives the transaction token, comprising the authentication ID and the extracted features. The recognition neural network 308 performs the classification. The recognition neural network 308 may analyze the extracted features to determine a probable user, or a list of probable users that match the extracted features. The recognition neural network 308 may perform the classification by comparing the extracted features in the transaction token with user biometric template data stored on the blockchain database 328 and associated with the user's authentication ID. The rider authentication server 304 fetches the appropriate blocks whose locations are associated with the authentication ID and verifies the biometric challenge 322 matches the user biometric template data stored on the blockchain database 328. If no match is found, the rider authentication server 304 will communicate to the vehicle to request a new biometric scan. The rider authentication server 304 may communicate directly with the vehicle or may communicate via the blockchain database 328. The autonomous vehicle 310 may have an indicator on the biometric reader to provide feedback on whether the biometric reader captured adequate biometric data. The process may be repeated as many times as necessary to identity the user, it may be repeated over a finite waiting period to accommodate current riders in the vehicle or traffic regulations, or it may be repeated over a finite number of rejections. The autonomous vehicle's 310 decision-making logic may take effect should no valid rider be found. If the rider's biometric challenge 322 matches the user biometric template data stored on the blockchain database 328, the rider authentication server 304 then instructs the autonomous vehicle 310 to grant access to the user. The rider authentication server 304 may transmit personalization data to the autonomous vehicle 310 or the autonomous vehicle 310 may pull the personalization data from the blockchain database 328. The autonomous vehicle 310 may query the blockchain database 328 to retrieve the personalization data.

Figure 4:
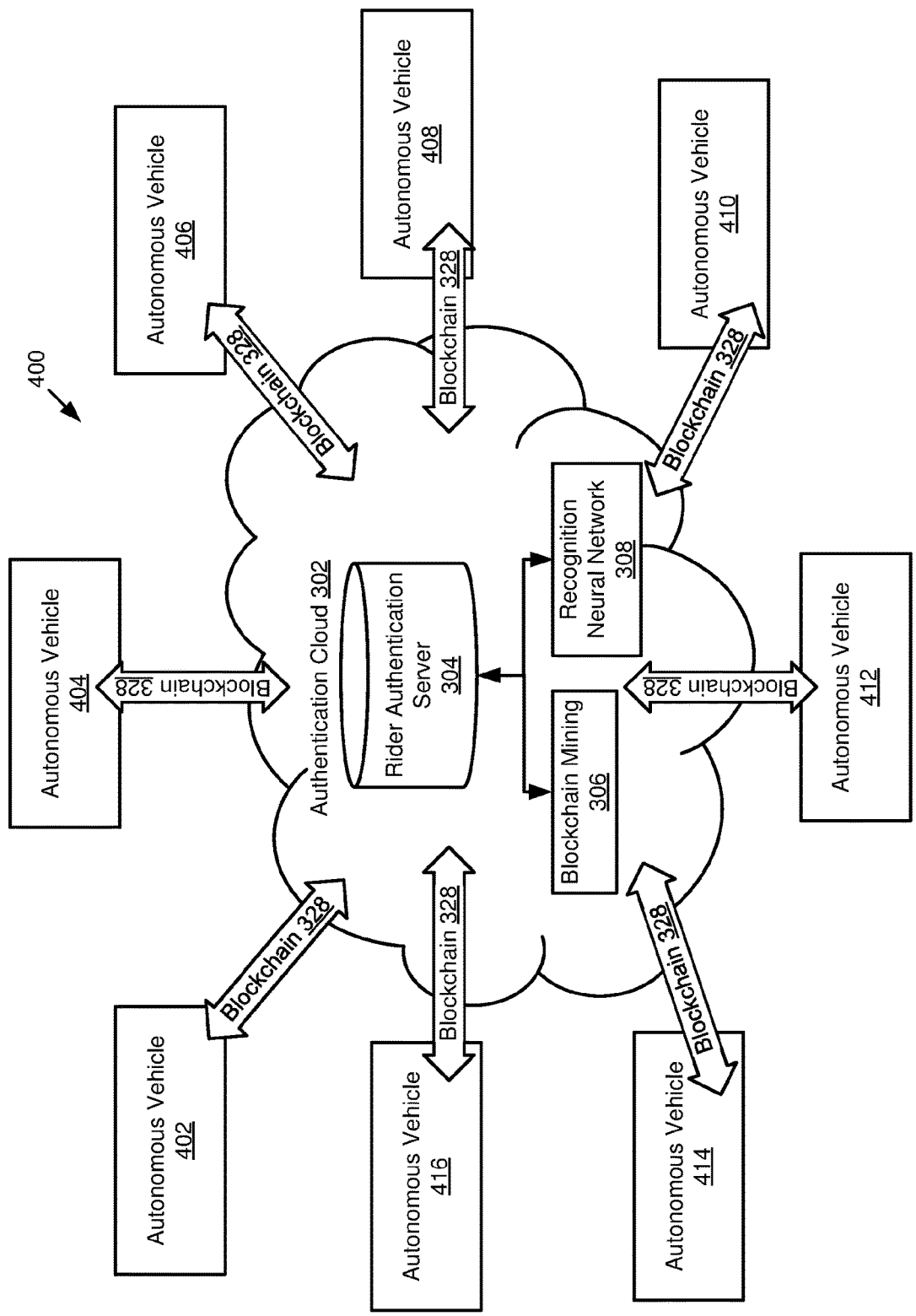
FIG. 4 is a schematic block diagram illustrating a system for verifying an identity of a vehicle user, according to one implementation.

FIG. 4 illustrates a system 400 for verifying an identity of a user or rider of a vehicle. The authentication cloud 302 is as disclosed in FIG. 3. As illustrated in FIG. 4, the authentication cloud 302 is in communication with a plurality of autonomous vehicles (see 402 thru 416) and each of the autonomous vehicles 402-416 is in communication with the authentication cloud 302 via the blockchain database 328. In an embodiment, the rider authentication server 304 serves as the central node of the blockchain database and each of the autonomous vehicles 402-416 serves as a peripheral node of the blockchain database 328.

Figure 5:
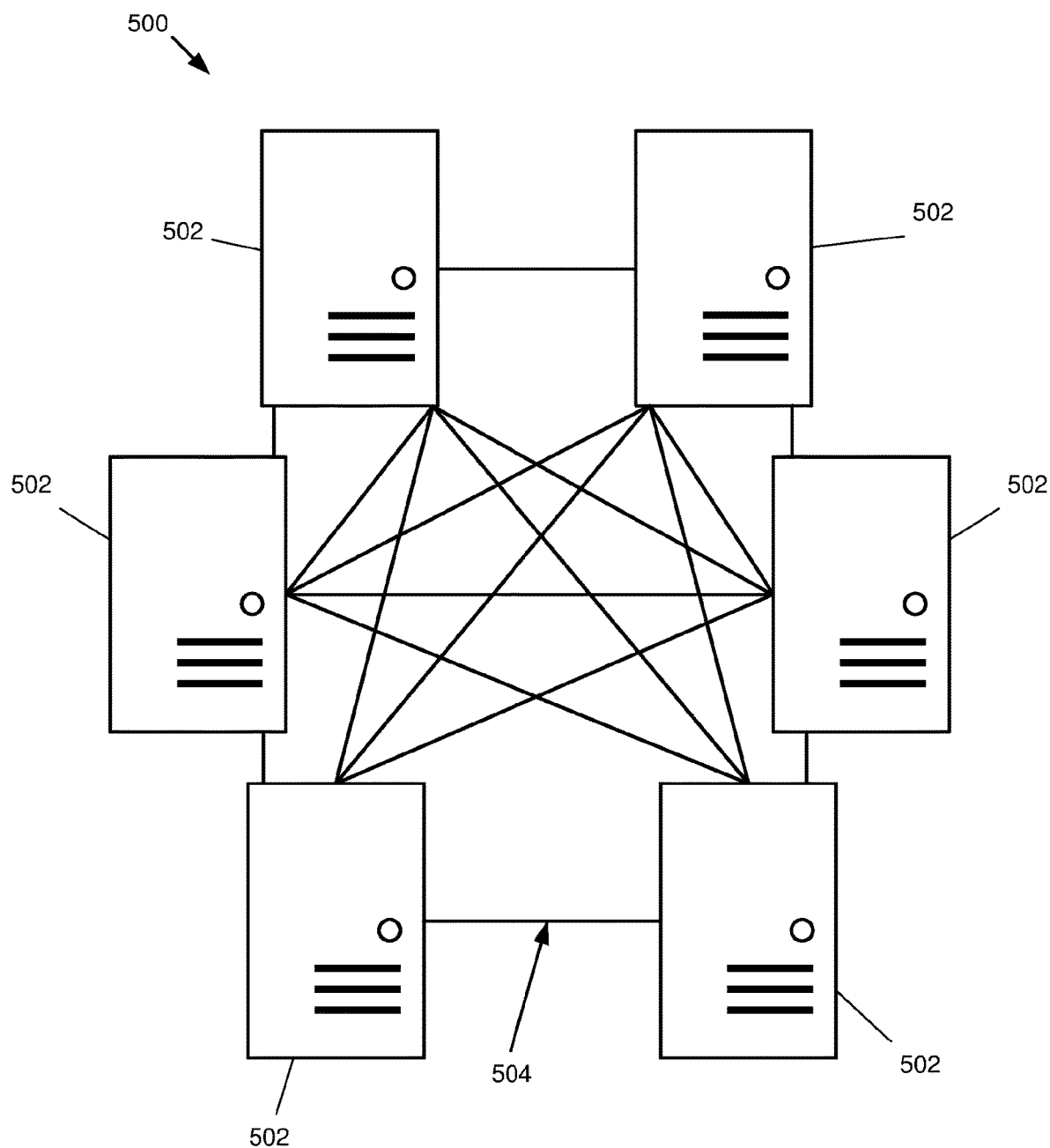
FIG. 5 is a schematic block diagram of a blockchain database, according to one implementation.

FIG. 5 is a schematic block diagram illustrating a decentralized network, such as a blockchain database 500. The blockchain database 500 is a decentralized network of computing nodes that form blocks. In an embodiment, the central node is the rider authentication server 304 and the additional nodes are a plurality of autonomous vehicles 310. The nodes 502 are each in communication 504 with one another.

In an embodiment, the plurality of nodes 502 comprise a plurality of vehicle controllers associated with a plurality of vehicles. That is, a single vehicle controller may serve as a single node 502 in the blockchain database 500. In an embodiment, a vehicle comprises a blockchain database 500 within the vehicle itself. In an embodiment, different geographical regions have a specialized blockchain database 500 for that region. For example, vehicles in a first geographical region may comprise a first blockchain database 500 and vehicles in a second geographical region may comprise a second blockchain database 500. In an embodiment, a plurality of users comprises a plurality of validator nodes 502 to form a blockchain database. In such an embodiment, each of the plurality of users may have cloud access, such as through a mobile device, vehicle, or cloud-based account, and each user may comprise a single node 502 making up the plurality of nodes 502 in a blockchain database 500. In an embodiment, a plurality of personal mobile devices, such as personal cellular phones, may comprise a node 502 to form a blockchain database 500.

It should be appreciated that blockchain databases 500 are inherently decentralized databases, where each transaction is verified by a strict set of blockchain rules and encryption is layered each time a new block is added to the blockchain database 500. The blockchain database 500 may be managed by a central node that manages the blockchain database 500 and provides rules, security requirements, and permissions for the blockchain database.

In an embodiment of the present disclosure, the authentication cloud 302 (or the rider authentication server 304) is the central node of the blockchain database 500. The authentication cloud 302 defines database permissions, handles decryption of biometric challenges 322, handles encryption of rider personal information, and performs mining the blockchain database 500 to verify all blocks of the blockchain database 500 are valid. Each autonomous vehicle 402 participates as a node on the blockchain database 500, requests to add blocks when users enroll in the system or request validation, assists in mining the blockchain database 500, handles encryption of biometric data received from vehicle sensors, and handles decryption of data received from the blockchain database 500.

Figure 6:
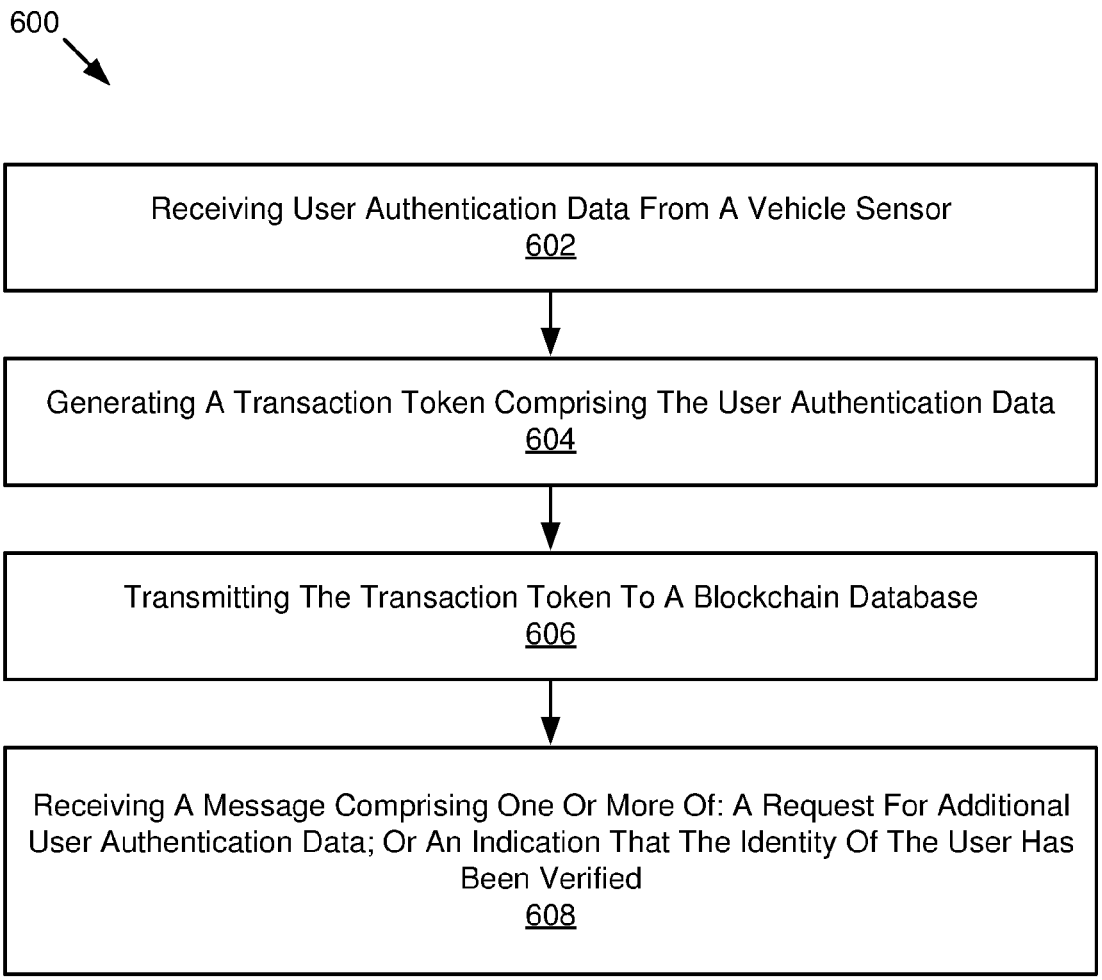
FIG. 6 is a schematic flow chart diagram illustrating a method for verifying an identity of a vehicle user, according to one implementation.

FIG. 6 is an example method 600 for verifying an identity of a vehicle user or rider. The method 600 begins and the vehicle controller 204 receives user authentication data from a vehicle sensor at 602. The vehicle controller 204 generates a transaction token comprising the user authentication data at 604 and transmits the transaction token to a blockchain database at 606. The vehicle controller 204 receives a message comprising one or more of: a request for additional user authentication data; or an indication that an identity of the user has been verified at 608.

Figure 7:
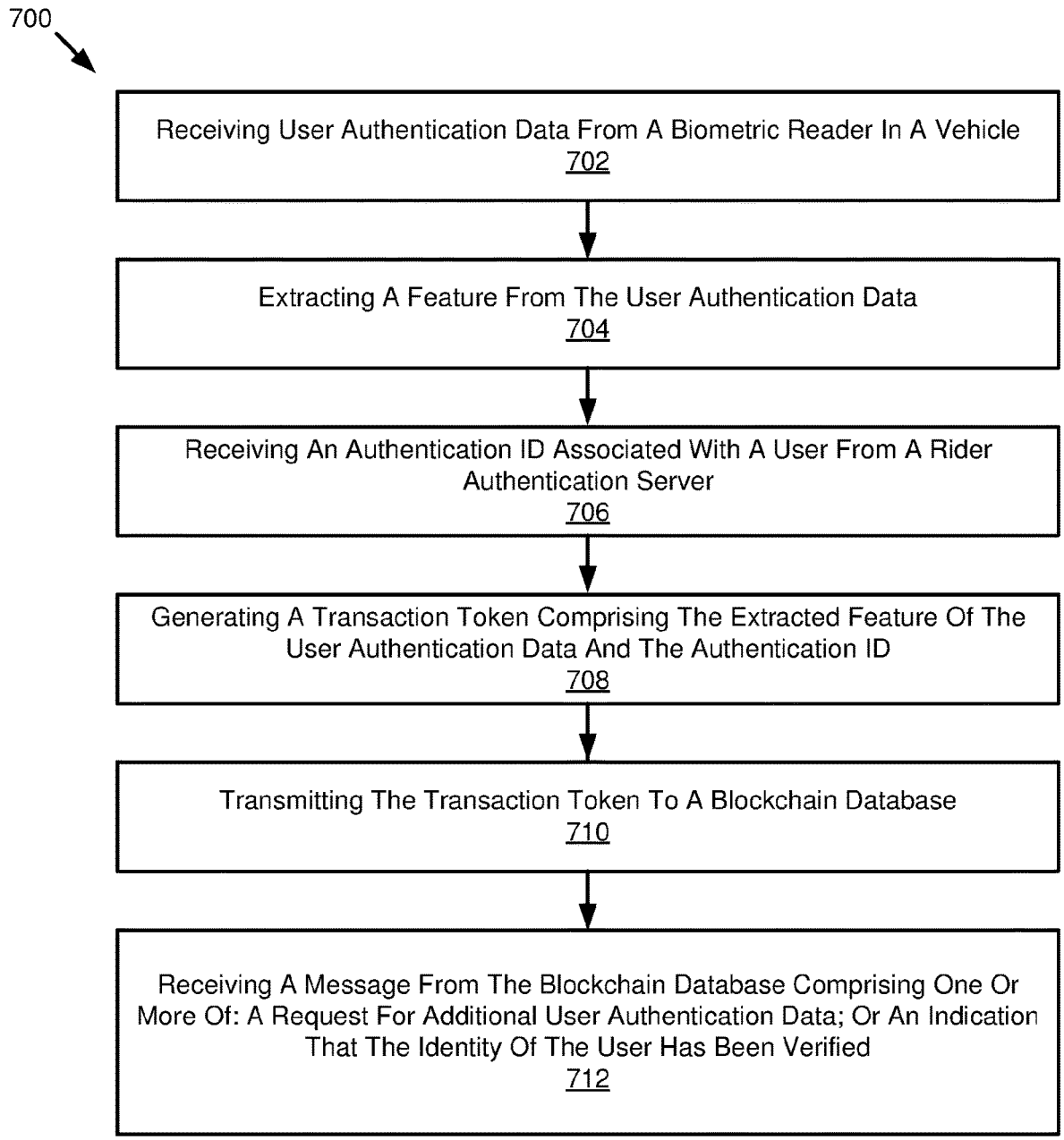
FIG. 7 is a schematic flow chart diagram illustrating a method for verifying an identity of a vehicle user, according to one implementation.

FIG. 7 is an example method 700 for verifying an identity of a vehicle user or rider. The method 700 begins and the vehicle controller 204 receives user authentication data from a biometric reader in a vehicle at 702. The vehicle controller 204 extracts a feature from the user authentication data at 704. The vehicle controller 204 receives an authentication ID associated with a user from a rider authentication server at 706. The vehicle controller 204 generates a transaction token comprising the extracted feature of the user authentication data and the authentication ID at 708 and transmits the transaction token to a blockchain database at 710. The vehicle controller 204 receives a message from the blockchain database comprising one or more of: a request for additional user authentication data; or an indication that the identity of the user has been verified at 712.

Figure 8:
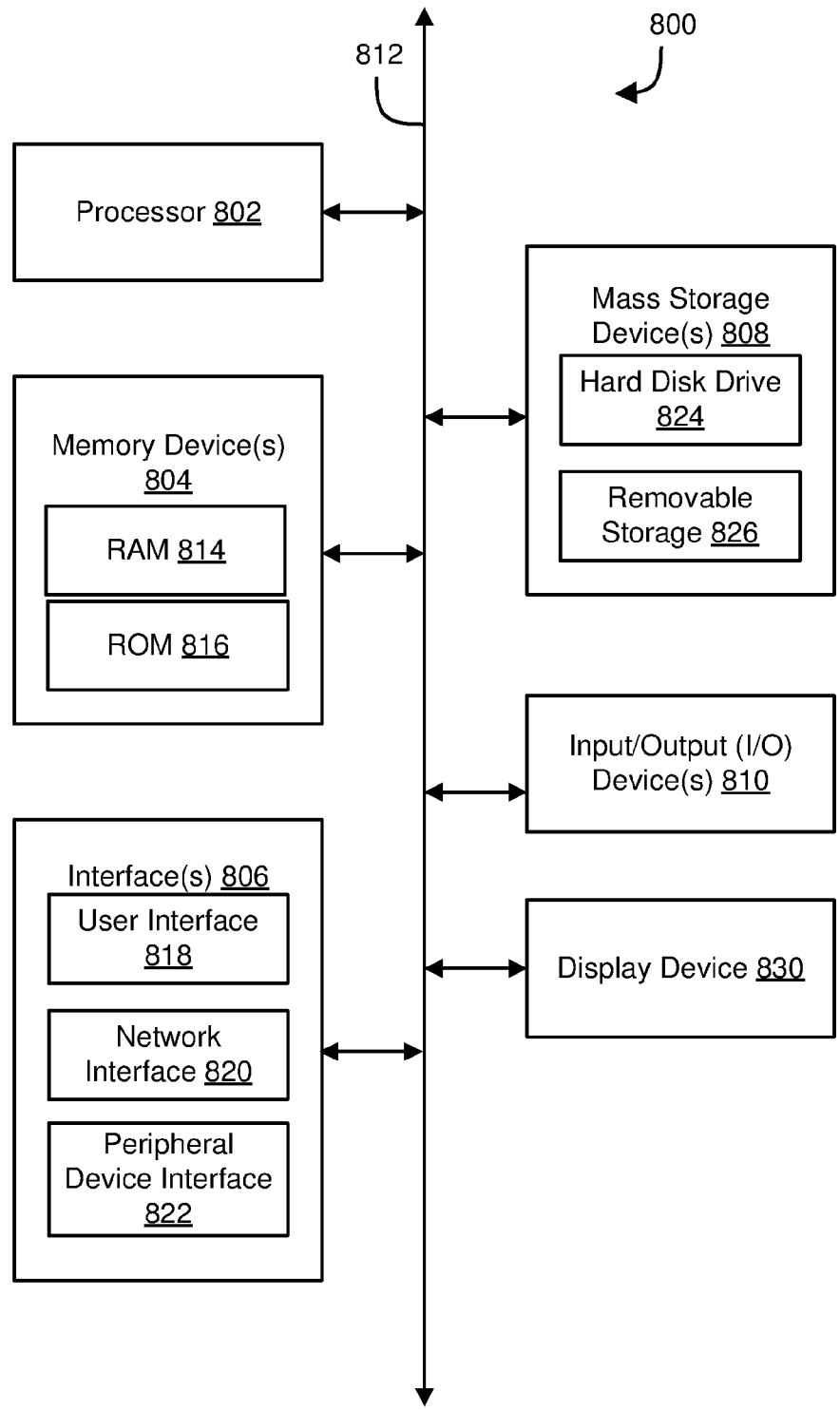
FIG. 8 is a schematic block diagram illustrating a computing system, according to one implementation.

Referring now to FIG. 8, a block diagram of an example computing device 800 is illustrated. Computing device 800 may be used to perform various procedures, such as those discussed herein. In one embodiment, the computing device 800 can function as an automated driving/assistance system 102, vehicle control system 100, neural network training system, or the like. Computing device 800 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for verifying an identity of a user of a vehicle. The method includes receiving user authentication data from a vehicle sensor; generating a transaction token comprising the user authentication data; transmitting the transaction token to a blockchain database; and receiving a message comprising one or more of: a request for additional user authentication data; or an indication that the identity of the user has been verified based on the user authentication data.

Example 2 is a method as in Example 1, wherein the user authentication data comprises biometric data and the vehicle sensor comprises a biometric reader.

Example 3 is a method as in any of Examples 1-2, wherein the biometric reader comprises one or more of a fingerprint scanner, a camera, a LIDAR sensor, a UV-A keypad, an iris recognition reader, and an infrared sensor.

Example 4 is a method as in any of Examples 1-3, further comprising extracting a feature from the user authentication data to generate an extracted feature, wherein the extracted feature comprises an identifying feature of an appearance of the user.

Example 5 is a method as in any of Examples 1-4, wherein the extracted feature comprises one or more of a curvature of a user's face, a facial proportion, a blood vessel pattern, and a three-dimensional depth of the user's face.

Example 6 is a method as in any of Examples 1-5, wherein the transaction token comprises the extracted feature in lieu of raw user authentication data that is received from the vehicle sensor.

Example 7 is a method as in any of Examples 1-6, further comprising encrypting the transaction token according to a security requirement of the blockchain database.

Example 8 is a method as in any of Examples 1-7, wherein transmitting the transaction token to the blockchain database comprises transmitting the transaction token to a rider authentication server via the blockchain database, and wherein the rider authentication server comprises a central node of the blockchain database and defines permissions for the blockchain database.

Example 9 is a method as in any of Examples 1-8, further comprising receiving an authentication ID associated with the user from a rider authentication server, wherein the rider authentication server is configured to generate the authentication ID when the user requests to create an account.

Example 10 is a method as in any of Examples 1-9, wherein the transaction token further comprises the authentication ID associated with the user.

Example 11 is a method as in any of Examples 1-10, wherein receiving the message comprises receiving the message from a rider authentication server via the blockchain database, and wherein the rider authentication server comprises a recognition neural network for verifying the identity of the user based on the user authentication data.

Example 12 is a method as in any of Examples 1-11, wherein the indication that the identity of the user has been verified further comprises personal data associated with the user and an indication that the user should be granted access to the vehicle, and wherein the personal data associated with the user comprises one or more of: a preference for a vehicle setting, a drive history, a probable driving route, a transaction history, a scheduled driving route, and profile data associated with the user.

Example 13 is a method as in any of Examples 1-12, further comprising mining the blockchain database to verify authenticity of blocks stored on the blockchain database.

Example 14 is computer readable storage media storing instructions that, when executed by one or more processors, cause the one or more processors to: receive user authentication data from a vehicle sensor; generate a transaction token comprising the user authentication data; transmit the transaction token to a blockchain database; and receive a message indicating one or more of: a request for additional user authentication data; or an indication that the identity of the user has been verified based on the user authentication data.

Example 15 is computer readable storage media as in Example 14, further comprising extracting a feature from the user authentication data to generate an extracted feature, and wherein the user authentication data comprises biometric data and the vehicle sensor comprises a biometric reader.

Example 16 is computer readable storage media as in any of Examples 14-15, wherein the transaction token comprises the extracted feature in lieu of raw user authentication data that is received from the vehicle sensor, and wherein the transaction token further comprises an authentication ID associated with the user that is received from a rider authentication server via the blockchain database.

Example 17 is computer readable storage media as in any of Examples 14-16, wherein the indication that the identity of the user has been verified further comprises personal data associated with the user and an indication that the user should be granted access to the vehicle.

Example 18 is computer readable storage media as in any of Examples 14-17, further comprising encrypting the transaction token according to a security requirement of the blockchain database.

Example 19 is a system. The system includes: a vehicle controller; one or more vehicle sensors in electronic communication with the vehicle controller and configured to capture user authentication data of a user of a vehicle; a rider authentication server configured to verify an identity of the user of the vehicle; and a blockchain database in communication with the rider authentication server and the vehicle controller; wherein the rider authentication server comprises a central node of the blockchain database.

Example 20 is a system as in Example 19, wherein the rider authentication server further comprises a recognition neural network configured to verify the identity of the user of the vehicle based on the user authentication data and user template data that is stored in the blockchain database.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for verifying an identity of a user of a vehicle comprising:
   determining user biometric template data;
   providing the user biometric template data to a blockchain database for decentralized storage in one or more blocks of the blockchain database, wherein the user biometric template data is stored in the one or more blocks according to one or more blockchain security requirements dictated by a rider authentication server, further wherein the user biometric template data is not stored in the rider authentication server;
   receiving user authentication data from a vehicle sensor of the vehicle;
   generating a transaction token comprising an authentication ID associated with the user received from the rider authentication server via the blockchain database and the user authentication data;
   transmitting the transaction token to the rider authentication server via the blockchain database that causes the rider authentication server to perform a verification of the transaction token by at least fetching the user biometric template data from the one or more blocks, wherein the rider authentication server comprises a central node of the blockchain database; and
   receiving a message comprising one or more of:
   a request for additional user authentication data; or
   an indication that the identity of the user has been verified based on the user authentication data.

2. The method of claim 1, wherein the user authentication data comprises biometric data and the vehicle sensor comprises a biometric reader.

3. The method of claim 2, wherein the biometric reader comprises one or more of a fingerprint scanner, a camera, a LIDAR sensor, a UV-A keypad, an iris recognition reader, and an infrared sensor.

4. The method of claim 1, further comprising extracting a feature from the user authentication data to generate an extracted feature, wherein the extracted feature comprises an identifying feature of an appearance of the user.

5. The method of claim 4, wherein the extracted feature comprises one or more of a curvature of a user's face, a facial proportion, a blood vessel pattern, a three-dimensional depth of the user's face, and a fingerprint pattern.

6. The method of claim 4, wherein the transaction token comprises the extracted feature in lieu of raw user authentication data that is received from the vehicle sensor.

7. The method of claim 1, further comprising encrypting the transaction token according to the one or more blockchain security requirements dictated by the rider authentication server.

8. The method of claim 1, wherein the one or more blockchain security requirements dictated by the rider authentication server define permissions for the blockchain database.

9. The method of claim 1, wherein the rider authentication server is configured to generate the authentication ID when the user requests to create an account.

10. The method of claim 9, wherein the transaction token further comprises the authentication ID associated with the user.

11. The method of claim 1, wherein receiving the message comprises receiving the message from the rider authentication server via the blockchain database, and wherein the rider authentication server comprises a recognition neural network for verifying the identity of the user based on the user authentication data.

12. The method of claim 11, wherein the indication that the identity of the user has been verified further comprises receiving personal data associated with the user and an indication that the user should be granted access to the vehicle, and wherein the personal data associated with the user comprises one or more of: a preference for a vehicle setting, a drive history, a probable driving route, a transaction history, a scheduled driving route, and profile data associated with the user.

13. The method of claim 1, further comprising mining the blockchain database to verify authenticity of the one or more blocks stored on the blockchain database.

14. One or more non-transitory computer readable storage media storing instructions for verifying an identity of a user of a vehicle that, when executed by one or more processors, cause the one or more processors to:

determine user biometric template data;
provide the user biometric template data to a blockchain database for decentralized storage in one or more blocks of the blockchain database, wherein the user biometric template data is stored in the one or more blocks according to one or more blockchain security requirements dictated by a rider authentication server, further wherein the user biometric template data is not stored in the rider authentication server;
receive user authentication data from a vehicle sensor of the vehicle;
generate a transaction token comprising an authentication ID associated with the user received from the rider authentication server via the blockchain database and the user authentication data;
transmit the transaction token to the rider authentication server via the blockchain database that causes the rider authentication server to perform a verification of the transaction token by at least fetching the user biometric template data from the one or more blocks, wherein the rider authentication server comprises a central node of the blockchain database; and
receive a message indicating one or more of:
a request for additional user authentication data; or
an indication that an identity of the user has been verified based on the user authentication data.

15. The one or more non-transitory computer readable storage media of claim 14, further comprising extracting a feature from the user authentication data to generate an extracted feature, and wherein the user authentication data comprises biometric data and the vehicle sensor comprises a biometric reader.

16. The one or more non-transitory computer readable storage media of claim 15, wherein the transaction token comprises the extracted feature in lieu of raw user authentication data that is received from the vehicle sensor.

17. The one or more non-transitory computer readable storage media of claim 14, wherein the indication that the identity of the user has been verified further comprises personal data associated with the user and an indication that the user should be granted access to the vehicle.

18. The one or more non-transitory computer readable storage media of claim 14, further comprising encrypting the transaction token according to a security requirement of the blockchain database.

19. A system comprising:
a vehicle controller;
one or more vehicle sensors in electronic communication with the vehicle controller and configured to capture user authentication data of a user of a vehicle;
a rider authentication server configured to send via the blockchain database an authentication ID associated with the user, verify an identity of the user of the vehicle by at least fetching user biometric template data from one or more blocks of a blockchain database for decentralized storage, wherein the verifying comprises the rider authentication server configured to receive a transaction token comprising the authentication ID and the captured user authentication data and perform a verification of the transaction token using the fetched user biometric template data; and
the blockchain database in communication with the rider authentication server and the vehicle controller, wherein the blockchain database is configured to receive the user biometric template data from the user during an enrollment of the user and store the user biometric template data on the one or more blocks of the blockchain database according to one or more blockchain security requirements dictated by the rider authentication server, further wherein the user biometric template data is not stored in the rider authentication server;
wherein the rider authentication server comprises a central node of the blockchain database.

20. The system of claim 19, wherein the rider authentication server further comprises a recognition neural network configured to verify the identity of the user of the vehicle based on the user authentication data and the user biometric template data that is stored in the blockchain database.

* * * * *